United States Patent
Lee et al.

(10) Patent No.: US 8,750,814 B2
(45) Date of Patent: Jun. 10, 2014

(54) TRANSMITTER/RECEIVER FOR WIRELESS COMMUNICATION SYSTEM

(75) Inventors: Ilgu Lee, Seoul (KR); Hun-Sik Kang, Daejeon (KR); Sok-Kyu Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 766 days.

(21) Appl. No.: 12/635,555

(22) Filed: Dec. 10, 2009

(65) Prior Publication Data

US 2010/0151898 A1    Jun. 17, 2010

(30) Foreign Application Priority Data

Dec. 11, 2008  (KR) .................. 10-2008-0125781

(51) Int. Cl.
| | | |
|---|---|---|
| H01Q 11/12 | (2006.01) | |
| H04B 1/44 | (2006.01) | |
| H01B 1/04 | (2006.01) | |
| H04B 17/00 | (2006.01) | |
| H04M 1/00 | (2006.01) | |
| G08C 17/00 | (2006.01) | |
| H04K 1/02 | (2006.01) | |
| H04L 25/03 | (2006.01) | |
| H04L 25/49 | (2006.01) | |

(52) U.S. Cl.
USPC ....... 455/127.2; 455/78; 455/126; 455/226.2; 455/550.1; 370/311; 375/297

(58) Field of Classification Search
CPC ........... H03G 3/3442; H04M 1/72522; H04W 88/02; H04W 88/06; H03F 1/3247
USPC ......... 455/11.1, 69, 73, 78, 84, 90.2, 91, 107, 455/108, 110, 111, 114.3, 126, 127.1, 455/127.2, 127.3, 127.4, 129, 191.3, 193.1, 455/272, 275, 522, 550.1, 553.1; 370/311, 370/334, 338; 375/219, 295, 297, 359, 376
See application file for complete search history.

(56) References Cited

U.S. PATENT DOCUMENTS 5,828,695 A * 10/1998 Webb ............................ 375/219
5,903,821 A * 5/1999 Ishikzuka ....................... 455/83
(Continued)

FOREIGN PATENT DOCUMENTS

| GB | 2374203 A | * 10/2002 |
|---|---|---|
| JP | 2005-520457 A | 7/2005 |

(Continued)

OTHER PUBLICATIONS

"RF Challenges for 2.4 and 5GHz WLAN Deployment and Design", vol. 2, pp. 783-788, published by WCNC.

(Continued)

Primary Examiner — Bobbak Safaipour
Assistant Examiner — Paul P Tran
(74) Attorney, Agent, or Firm — Kile Park Reed & Houtteman PLLC

(57) ABSTRACT

A transmitter/receiver for a wireless communication system is provided. The transmitter for a wireless communication system includes: an external amplifier connected to a next stage of a power amplifier amplifying a signal to be transmitted to a required power level; a transmission selector configured to directly output the signal amplified by the power amplifier to an antenna or control the external amplifier to amplify the signal, based on a mode control signal; and a mode selector configured to compare a power level of a signal provided from a receiver with a predetermined power level to generate the mode control signal for determining whether or not to operate the external amplifier.

9 Claims, 3 Drawing Sheets

(56) References Cited

U.S. PATENT DOCUMENTS

| | | | |
|---|---|---|---|
| 5,909,643 A * | 6/1999 | Aihara | 455/127.3 |
| 6,205,171 B1 * | 3/2001 | Yang et al. | 375/219 |
| 6,304,139 B1 * | 10/2001 | Kanno | 330/133 |
| 7,092,676 B2 * | 8/2006 | Abdelgany et al. | 455/76 |
| 2003/0086383 A1 * | 5/2003 | Bremer et al. | 370/311 |
| 2005/0170788 A1 * | 8/2005 | Tanaka et al. | 455/73 |
| 2005/0227640 A1 * | 10/2005 | Haque et al. | 455/126 |
| 2006/0025072 A1 | 2/2006 | Pan | |
| 2007/0004414 A1 * | 1/2007 | Seki et al. | 455/441 |
| 2007/0080748 A1 * | 4/2007 | Giatis et al. | 330/129 |
| 2007/0155344 A1 * | 7/2007 | Wiessner et al. | 455/78 |
| 2009/0081972 A1 * | 3/2009 | Rofougaran | 455/127.1 |
| 2010/0008338 A1 * | 1/2010 | Tsfati et al. | 370/338 |

FOREIGN PATENT DOCUMENTS

| | | |
|---|---|---|
| JP | 2006-014102 A | 1/2006 |
| WO | 03/101133 A1 | 12/2003 |

OTHER PUBLICATIONS

"RF Challenges for 2.4 and 5GHz WLAN Deployment and Design", vol. 2, pp. 783-788, published by WCNC, Ming-Ju Ho, Michael S. Rawless, Marcel Vrijkote and Louis Fei; 2002 IEEE.

Il-Gu Lee et al., "Field Test and Experimental Characterization of 5GHz RF Transceivers for Coverage Extension", Wireless Communications and Networking Conference (WCNC), pp. 1-4, Apr. 2009.

* cited by examiner

TRANSMITTER/RECEIVER FOR WIRELESS COMMUNICATION SYSTEM

CROSS-REFERENCE(S) TO RELATED APPLICATIONS

The present application claims priority of Korean Patent Application No. 10-2008-0125781, filed on Dec. 11, 2008, which is incorporated herein by reference in its entirety.

BACKGROUND OF THE INVENTION

1. Field of the Invention

Exemplary embodiments of the present invention relate to a transmitter/receiver for a wireless communication system; and, more particularly, to an RF signal transmitter/receiver for a wireless communication system.

2. Description of Related Art

In general, wireless communication systems process data and transmit signals using predetermined frequencies. Such wireless communication systems may be classified into wireless communication systems for providing a voice service, and wireless communication systems for providing a packet data service. Examples of the wireless communication system for providing a package data service may include a wireless Local Area Network (LAN) system, a Wireless Broadband (WiBro) system, a Worldwide Interoperability for Microwave Access (Wimax) system, and so on.

Recently, to meet a demand for increasing large-volume multimedia contents, various techniques at a Media Access Control (MAC) layer and a physical (PRY) layer have been developed and used in wireless communication standards such as wireless LAN, WiBro, Wimax and so on. Techniques commonly used in such wireless communication systems will be described below The above-described systems use an Orthogonal Frequency Division Multiplexing (OFDM) scheme. Using the OFDM scheme, the systems may use multi-carriers. Therefore, the systems have a transmission speed of several tens of mega bytes in a limited bandwidth. Furthermore, the above-described systems use a multi-antenna technology. The multi-antenna technology is a scheme in which different signals are loaded to and transmitted through a plurality of antennas. Theoretically, the multi-antenna technology may improve a transmission speed in proportion to the number of antennas. That is, when the number of antennas increases two or three times larger than when one antenna is used, the transmission speed is improved two or three times higher.

For example, the wireless LAN system has a transmission speed of 11 Mbps in IEEE 802.11b using a Complementary Code Keying (CCK) scheme. However, a transmission speed of up to 54 Mbps may be supported in IEEE 802.11g/a using the OFDM scheme, and a physical layer data rate of 300 Mbps or more may be supported in IEEE 802.11n using the multi-antenna technology.

Such a comparison was made on the basis of the PHY layer. In the MAC layer, a throughput is defined at a data rate which users actually feel on use. The throughput is calculated by dividing the length of packets, which are successfully transmitted among transmitted packets, by a time required for the transmission. That is, the throughput is calculated by dividing the length of successfully transmitted packets by the time required for transmitting the overall packets. For the time required for transmitting the overall packets, a packet header, a preamble, a packet interval, or a back-off time operates as an overhead. Therefore, when the data rate of the physical layer is 54 Mbps, a throughput of about 25 Mbps is acquired in the MAC layer. Furthermore, although the PHY layer supports a data rate of 300 Mbps in IEEE 802.11n, only a throughput of 60 Mbps or less is acquired in the MAC layer. To prevent such a reduction in throughput caused by the overhead, packet aggregation and block ACK schemes are used in the MAC layer. When these schemes are applied, a throughput of 200 Mbps or more may be supported.

As the above-described technology is used, a terminal in the wireless communication system may use the Internet while in motion. Furthermore, the terminal may use video calls and large-volume multimedia contents.

When designing the wireless communication system, a maximum transmission rate which can be supported and a signal transmission distance are the most important two factors. Therefore, the signal transmission distance should be considered together with the improvement of the maximum transmission rate.

Methods used for improving the signal transmission distance will be described below. There may be several methods for improving the signal transmission distance. To improve the signal transmission distance, a link adaptation scheme in the MAC layer and an improvement method using a protocol are generally used. Furthermore, studies on an improvement method using channel coding of the PHY layer or a digital front end have been actively conducted. More specifically, a method of adjusting a transmission power and a data rate in the MAC layer may be used to extend the signal transmission distance. That is because the amount and transmission speed of data which can be transmitted in the wireless communication system are determined based on a distance between a terminal and a terminal, a base station of the system, or an access point and a channel environment. That is, when a distance between objects performing a wireless communication is short and a signal-to-noise ratio (SNR) is good, data may be transmitted at a high speed using a high data rate. On the other hand, when a distance between objects performing a wireless communication is long or an SNR is bad, data should be transmitted at a low speed using a low data rate. Through such a method, it is possible to extend the distance between objects performing a wireless communication.

In terms of power, when a distance between objects performing a wireless communication is short, low transmission power may be used to receive data. Therefore, the transmission power is reduced to minimize power consumption. On the other hand, when a distance between objects performing a wireless communication is long, high transmission power is used to extend a transmission distance. Studies on such a method and apparatus for controlling transmission power have been steadily conducted.

However, since the improvement of gain using a multi-stage amplifier provided in an RF processing unit is based on analog elements having a non-linear characteristic, there may be a limitation. When a power amplifier having a large gain is unconditionally used to increase transmission efficiency of a transmitted signal, short-distance signals reach a saturation state. Then, the signals are distorted. When a power amplifier having a small gain is used to prevent the saturation state, an SNR decreases to degrade performance.

In an RF module, studies on performance improvement for each element are actively conducted. Since the RF module includes analog elements having a non-linear characteristic, a range of guaranteeing gain linearity is limited. Therefore, the distribution of gain from an input stage to an output stage is important. Furthermore, there are many difficulties such as phase noise and the stability of center frequency. The phase noise is generated while a basic frequency is divided to convert an RF signal into a baseband signal, and vice versa. To solve such problems and improve the performance, various studies have been steadily conducted. Recently, studies on an RF module for transmitting data at a high speed in a limited bandwidth by applying the OFDM have been actively conducted. This is because it has become very difficult to satisfy the design and the required performance in the case of the OFDM using multi-carriers, not a single carrier. That is, as the wireless communication systems use multi-carries instead of a single carrier and multi-antennas instead of a single antenna, the design and verification have become complicated. Therefore, a verification method at a system level and an access in terms of system are needed.

A receiver of a wireless communication system receives an RF signal to demodulate into a baseband signal and converts the demodulated baseband signal into a digital signal. A modem of the receiver compensates for a signal distorted by a channel or an analog element and decodes the signal. A transmitter of the wireless communication system encodes data which is to be transmitted, and a digital-analog converter (DAC) converts the encoded data into an analog signal. Further, an RF unit modulates the converted analog signal into an RF signal and transmits the modulated RF signal. To extend a signal transmission distance in such a transmission/reception process, an access should be made in terms of two factors, that is, transmission power and reception signal noise. Before passing through a DAC, a signal is basically determined by the bit number of the DAC and a voltage used by the system. Therefore, the signal should be determined using a small bit number and a small voltage because of the system price and the limited power. After passing through the DAC, the analog signal is amplified by the RF unit using transmission power amplifiers. At this time, all the power amplifiers have a nonlinear characteristic. In a linear interval, the gains of the amplifiers are controlled. Such a linear interval ranges from 20 dB to 25 dB. The linear interval is difficult to increase, and a start point of the linear interval is determined based on the maximum transmission power required by a system. For example, a general transmission power amplifier for wireless LAN receives a signal of −30 dBm to −5 dBm, and outputs a signal of −10 dBm to 15 dBm. When the amplifier is replaced with a high-gain power amplifier, a signal of 10 dBm to 35 dBm may be outputted.

Second, reception signal noise needs to be considered, in order to extend the signal transmission distance. A receiver of a wireless communication system includes a low-noise amplifier (LNA) which amplifies a received signal of which the magnitude is small. The LNA is designed to minimize an effect upon noise unlike a general baseband amplifier. When a large signal is inputted, the LNA operates in a low-gain mode to decrease the magnitude of the signal. When a small signal is inputted, the LNA operates in a high-gain mode to increase the magnitude of the signal. In general, a noise figure is small in the low-gain mode, but large in the high-gain mode. Therefore, since the high-gain mode is a mode in which the LNA operates when an input signal is small, a relatively large noise figure decreases a signal-to-noise ration (SNR) of a received signal, thereby degrading the performance of the LNA. To improve the performance of the LNA operating in the high-gain mode, an LNA having a better noise figure may be provided outside the RF system. Then, the noise figure may be improved. However, if the external LNA is unconditionally used, a signal saturation state occurs in an RF unit when a large signal is inputted.

In short, the method of using the high-gain transmission power amplifier and the gain antenna and the method of using the external LNA may be applied to extend the signal transmission distance. However, when the high-gain power amplifier and the external LNA are used at a short distance, the signal saturation may occur in the receiver side. Otherwise, when they are not used, the signal transmission distance may decrease.

SUMMARY OF THE INVENTION

An embodiment of the present invention is directed to a transmitter/receiver capable of increasing a signal transmission distance.

Another embodiment of the present invention is directed to an apparatus for adaptively controlling transmission power based on a signal-to-noise ratio (SNR).

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with an embodiment of the present invention, a transmitter for a wireless communication system includes: an external amplifier connected to a next stage of a power amplifier amplifying a signal to be transmitted to a required power level; a transmission selector configured to directly output the signal amplified by the power amplifier to an antenna or control the external amplifier to amplify the signal, based on a mode control signal; and a mode selector configured to compare a power level of a signal provided from a receiver with a predetermined power level to generate the mode control signal for determining whether or not to operate the external amplifier.

In accordance with an embodiment of the present invention, a receiver for a wireless communication system includes: an external low noise amplifier (LNA) configured to previously low-noise amplifies a signal received from an antenna; a reception selector configured to receive the signal received from the antenna and the output signal of the external LNA and select one between the two signals on the basis of a mode selection signal; and a mode selector configured to compare a Received Signal Strength Indicator (RSSI) of the received signal with a predetermined critical value to generate the mode selection signal for determining whether or not to operate the external LNA.

DESCRIPTION OF SPECIFIC EMBODIMENTS

Figure 1:
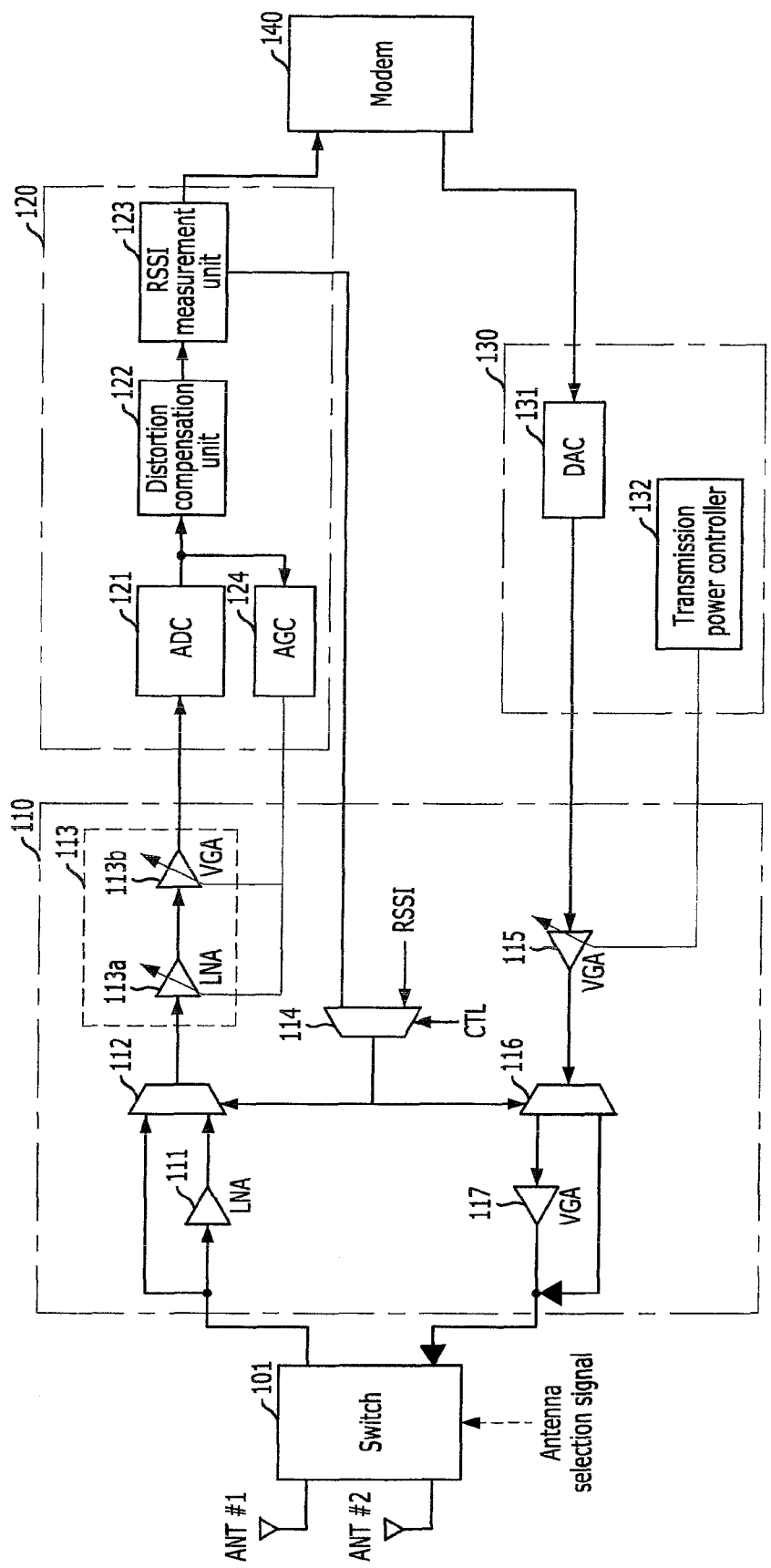
FIG. 1 is an internal configuration diagram of a wireless transmitter in accordance with an embodiment of the present invention.

Exemplary embodiments of the present invention will be described below in more detail with reference to the accompanying drawings. The present invention may, however, be embodied in different forms and should not be constructed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention. The drawings are not necessarily to scale and in some instances, proportions may have been exaggerated in order to clearly illustrate features of the embodiments.

FIG. 1 is an internal configuration diagram of a wireless transmitter in accordance with an embodiment of the present invention. FIG. 1 illustrates only components required in the embodiment of the present invention. An actual wireless transmitter may include other components in addition to the configuration of FIG. 1.

The wireless transmitter in accordance with the embodiment of the present invention includes two antennas ANT #1 and ANT #2 having different characteristics. The first antenna ANT #1 has a general characteristic, that is, a no-gain characteristic. The second antenna ANT #2 has a high gain. Such antennas ANT #1 and ANT #2 are connected to a switch 101. The switch 101 selects one between the first antenna having a general characteristic and the second antenna having a high gain, based on an antenna selection signal.

First, the configuration of a receiver side in accordance with the embodiment of the present invention will be described.

The signal received from the switch 101 is inputted to an RF front-end unit 10 and then divided into two signals. One of the two signals is inputted to an external low noise amplifier (LNA) 111, and the other is inputted to a reception selector 112. The external LNA 111 low-noise amplifies the signal received through the switch 101, and inputs the amplified signal to the reception selector 112. The reception selector 112 is controlled by a mode electrode 114, which will be described below, to select and output one between the signal received from the switch 101 and the signal received from the external LNA 111. When the reception selector 114 is set so as not to receive the signal of the external LNA 111 in order to reduce reception power of the receiver, power supplied to the external LNA 111 may be cut off. The signal selected by the reception selector 112 is inputted to an amplification unit 113 provided in the RF front-end unit 110. The amplification unit 113 includes a low noise amplifier 113$a$ and a variable gain amplifier (VGA) 113$b$. The LNA 113$a$ and the VGA 113$b$ control a gain of the received signal using a predetermined control value which will be described below, and then outputs the gain-controlled signal to a receiver digital front-end unit 120. FIG. 1 does not illustrate a component for band down conversion of a wireless signal. In the band down conversion, a superheterodyne scheme which is widely used may be used, or a direct conversion scheme may be used. The detailed description of the band down conversion will be omitted.

The signal inputted to the receiver digital front-end unit 120 is inputted to an analog-digital converter (ADC) 121. The ADC 121 converts the inputted analog signal into a digital signal. The signal outputted from the ADC 121 is divided into two signals. One is inputted into a distortion compensation unit 122, and the other is inputted into an automatic gain controller (AGC) 124. The distortion compensation unit 122 compensates for distortion of the inputted signal to output to a Received Signal Strength Indicator (RSSI) measurement unit 123. The RSSI measurement unit 123 measures an RSSI of the signal whose distortion is compensated for by the distortion compensation unit 122. Then, the RSSI measurement unit 123 outputs the measured RSSI, and simultaneously, transmits the signal whose distortion is compensated for to the modem 140.

The AGC 124 receiving the signal outputted from the ADC 121 checks the level of the signal. Based on the checked level of the signal, the AGC 124 determines gains of the LNA 113$a$ and the VGA 113$b$ of the amplification unit 113 provided in the RF front end unit 110, and then provides the gain of the amplification unit 113.

Next, a process of transmitting a signal will be described. A signal modulated and coded by modem 140 is inputted to a digital-analog converter (DAC) 131 of a transmitter front-end unit 130. The DAC 131 converts the inputted digital signal into an analog signal to provide to the RF front-end unit 110. Components for band up conversion of the transmitted signal are not illustrated herein, and the descriptions thereof will be omitted. The transmitter front-end unit 130 has a transmission power controller 132. The transmission power controller 131 determines and outputs a transmission power value of a signal which is to be transmitted, that is, a gain of a transmission amplifier of the RF front-end unit 110.

A VGA 115 of the RF front-end unit 110 amplifies the inputted signal with the gain received from the transmission power controller 132, and provides the amplified signal to a transmission selector 116. The transmission selector 116 selectively outputs a first output or a second output based on a control signal which will be described below. The first output of the transmission selector 116 is inputted to the external VGA 117 in accordance with the embodiment of the present invention. The external VGA 117 amplifies the inputted signal with a predetermined gain. The output of the external VGA 117 and the second output of the transmission selector 116 are wired to be inputted to the switch 101.

As described above, the switch 101 selects one antenna between the first and second antennas ANT #1 and ANT #2 based on the antenna selection signal, and then outputs a transmission signal.

The mode selector 114, which generates a control signal of the reception selector 112 and the transmission selector 116 in accordance with the embodiment of the present invention, receives a signal from the RSSI measurement unit 123 as one input, as described above. Furthermore, the mode selector 114 receives an RSSI signal which is directly measured from a wireless signal, as another input. The mode selector 114 selectively output the two signals based on a control signal CTL. The control signal CTL may be provided from a device which is programmably implemented in a register (not shown) or a processor which performs a control function. In this embodiment, it is assumed that the control signal is provided from a control unit, for convenience of description.

Next, an operation in accordance with the embodiment of the present invention will be described.

When the above-described transmitter having the configuration of FIG. 1 receives a signal, the second antenna ANT #1 having a high gain is first used, and the external LNA 111 is not used. The signal received in such a manner is inputted to the ADC 121 and converted into a digital signal. Then, the digital signal is inputted to the AGC 124 to output a gain for controlling the amplification unit 113. The outputted gain may be used to control the gain of the amplification unit 124.

The distortion compensation unit 122 compensates for the distortion of the digital signal to input to the RSSI measurement unit 123. The RSSI measurement unit 123 measures an RSSI from the signal whose distortion is compensated for. At this time, the RSSI measured by the RSSI measurement unit 123 corresponds to a value calculated by Equation 1 below.

$$\text{RSSI of RSSI measurement unit 123} = \text{Gain of LNA 113}a + \text{Gain of VGA 113}b + \text{signal magnitude of ADC 121} \qquad \text{Eq.1}$$

Based on a control signal, the mode selector 114 selects one signal between the RSSI calculated by Equation 1 and a value directly measured from a wireless signal. When the one signal selected between the above-described values exceeds a predetermined critical value, this case corresponds to a low-gain mode. Then, the first antenna ANT #1 having no gain is used. At this time, power supplied to the external LNA 111 and the external VGA 117 is cut off to reduce the power consumption of the receiver. That is, the two external amplifiers 111 and 117 are set so as not to perform an amplification operation. On the other hand, when the selected signal is equal to or less than the predetermined critical value, a high gain is required. This case corresponds to a high-gain mode. In the high-gain mode, current is supplied to the second antenna ANT #2 having a high gain, the external LNA 111, and the external VGA 117 to amplify the signal. Therefore, the signal may be transmitted/received adaptively to a wireless channel environment and a distance.

Figure 2:
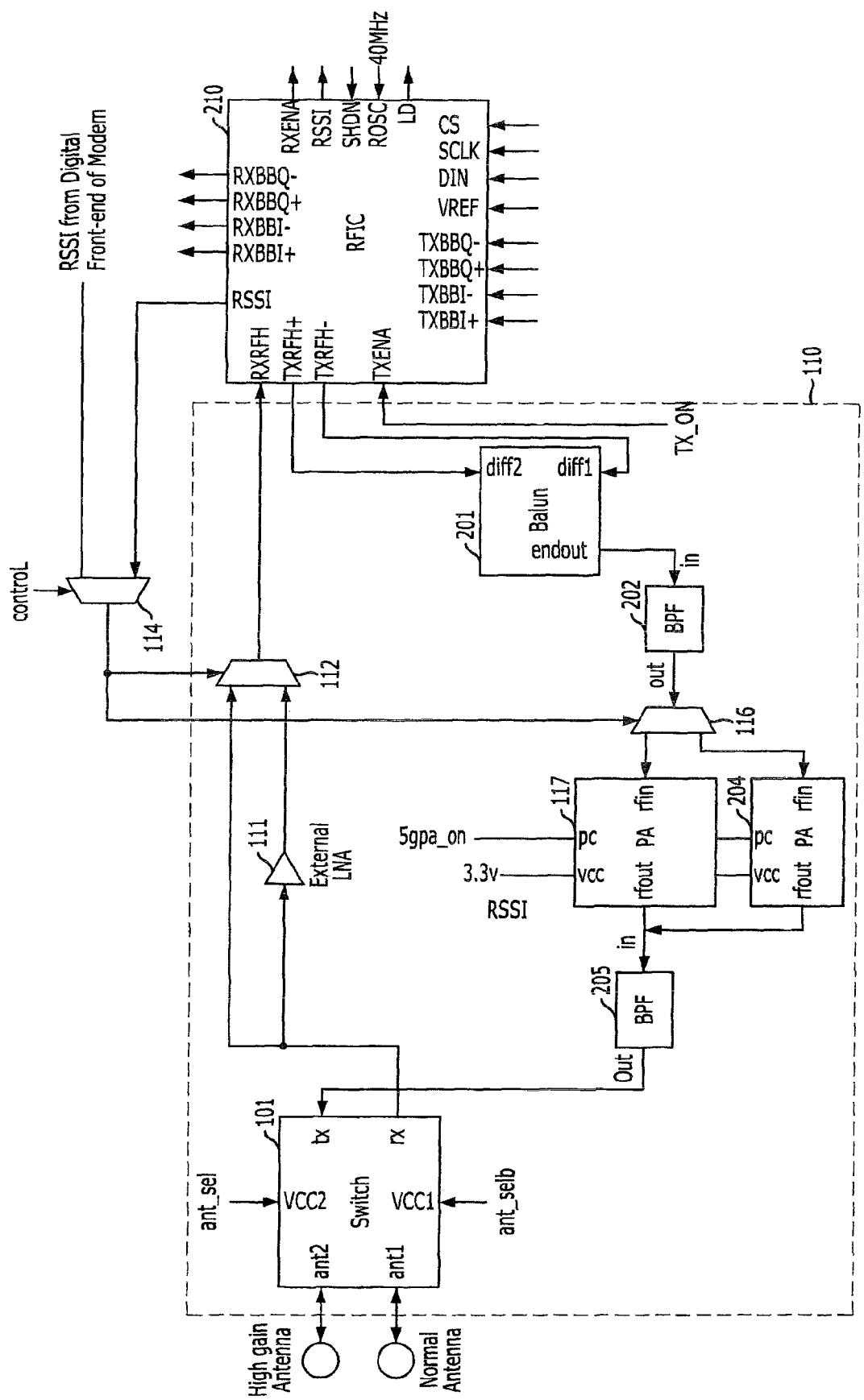
FIG. 2 is a diagram illustrating the detailed configuration of an RF front-end unit and the connection relation of a wireless chip in accordance with the embodiment of the present invention.

FIG. 2 is a diagram illustrating the detailed configuration of the RF front-end unit in accordance with the embodiment of the present invention and the connection relation of a wireless chip.

The RF front-end unit 110 has the same configuration as that of the RF front-end unit described in FIG. 1. However, FIG. 2 further includes components omitted in FIG. 1, and the switch 101 is included in the RF front-end unit 110.

The switch 101 has a terminal connected to the first antenna ANT #1 having a general characteristic, that is, a no-gain characteristic, and a terminal connected to the second antenna ANT #2 having a high gain characteristic. The switch 101 may select and switch the respective antennas depending antenna selection signals ant_sel and ant_selb. Furthermore, the switch 101 includes a terminal tx receiving a transmitted signal and a terminal rx outputting a received signal. A signal received to the switch 101 is divided into two signals, of which one is inputted to the external LNA 111 and the other is inputted to the reception selector 112. The external LNA 111 low-noise amplifies the inputted signal to output as another input of the reception selector 112. Then, the reception selector 112 selectively outputs one signal based on a control signal. The output signal of the reception selector 112 is inputted to a terminal RXRFH of an RFIC chip 210.

Signals TXRFH+ and TXRFH−, wireless transmission signals are inputted to input terminals diff1 and diff2 of a balun 201, respectively, and the balun 201 shifts the phases of the signals TXRFH+ and TXRFH− to output phase-shifted signals through a terminal endout. A first band-pass filter (BPF) 202 removes spurious waves from the phase-shifted signals, and inputs the signals to the transmission selector 116. The transmission selector 116 inputs the signals to the VGA 117 operating as a power amplifier or a power amplifier 204 which does not perform a specific amplification operation, based on the selection signal output from the mode selector 114. The signal outputted from one of the power amplifiers 117 and 204 is inputted to a second BPF 205. The second BPF 205 eliminates an unwanted band signal band from the inputted signal, and inputs the signal to the transmission terminal tx of the switch 101. Although not described, the mode selector 114 receives an RSSI acquired from a wireless signal in the RFIC chip 210 as one input. Furthermore, as described in FIG. 1, the mode selector 114 receives the RSSI calculated by Equation 1 as another input. Between the two RSSIs, one RSSI is selected and outputted on the basis of a predetermined control signal.

The RFIC chip 210 converts an analog-converted transmission signal into a transmission-band signal, and band-down converts an analog wireless signal inputted from the reception selector 112. The other ports of the RFIC chip 210 of FIG. 2 are illustrated for reference. Since the ports are not significantly related to the embodiment of the present invention, the detailed descriptions thereof will be omitted.

The above-described wireless transmitter/receiver in accordance with the embodiment of the present invention has the following effects, compared with a conventional transmitter/receiver.

First, while the conventional transmitter/receiver has a signal transmission distance of about 100 m at the maximum, the transmitter/receiver in accordance with the embodiment of the present invention may extend the signal transmission distance to about 800 m or 1 Km or more. In the PHY layer, the following two methods may be used to extend the signal transmission distance. First, coding schemes such as Viterbi decoding, turbo coding, Low Density Parity Check (LDPC), and Space Time Block Code (STBC) may be used to correct an error of a signal into which noise is mixed by a channel. Second, a distorted signal generated from a channel of a digital front end and an analog element may be compensated for to extend the signal transmission distance.

In the above-described embodiment of the present invention, the digital modem or RF stage measures an RSSI to switch the transmission power amplifier and the external LNA such that a long-distance signal is transmitted with an increased amplitude. Furthermore, a long-distance signal is received with an increased level. However, a short-distance signal is transmitted with a low level, and received with a decreased amplitude. Such a configuration may prevent the interference with other terminals, making possible to increase signal transmission/reception efficiency.

The transmitter/receiver in accordance with the embodiment of the present invention may be used to use three modes, that is, a high-gain mode, a medium-gain mode, and a low-gain mode. The high-gain mode refers to a case in which an antenna having a gain, a high-gain amplifier, and an external LNA are used. The medium gain mode refers to a case in which an antenna having no gain, a high-gain amplifier, and an external LNA are used. The low-gain mode refers to a case in which an antenna having no gain is used, but a high-gain amplifier and an external LNA are not used. In the three cases, Error Vector Magnitudes (EVM) may be measured based on a distance.

Figure 3:
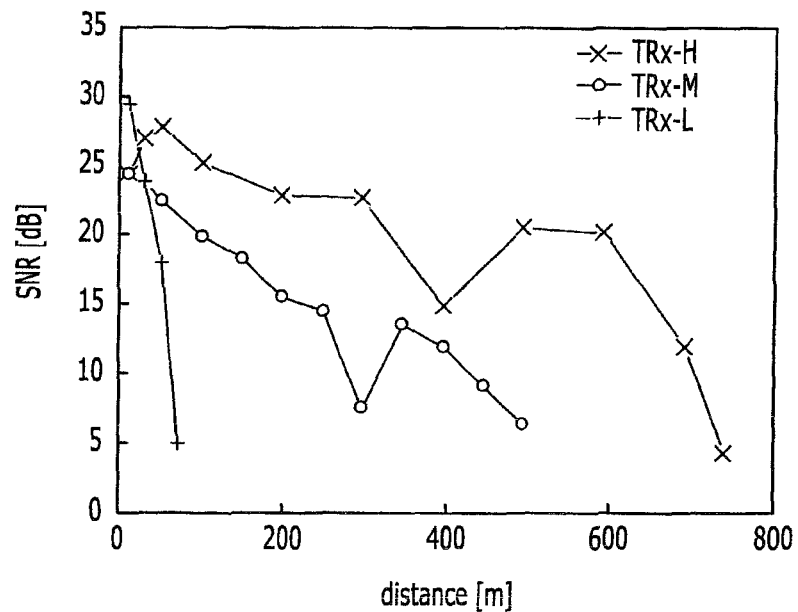
FIG. 3 is a graph showing a distance and an Error vector Magnitude (EVM) for each gain mode in the transmitter/receiver in accordance with the embodiment of the present invention.

FIG. 3 is a graph showing the distance and the EVMs for the respective gain modes in the transmitter/receiver in accordance with the embodiment of the present invention.

The experiment of FIG. 3 was performed in an outdoor environment without obstacles. In the experiment, 6 Mbps mode in 5 GHz bandwidth was used in accordance with IEEE 802.11a, a binary phase shift keying (BPSK) scheme was used as a modulation scheme, and OFDM signals were used. The experiment result of FIG. 3 may be an example for explaining the effect of the embodiment of the present invention, and may be applied to other wireless communication standards and applications.

In FIG. 3, a symbol 'x' indicates the high-gain mode TRx-H, a symbol 'o' indicates the medium-gain mode TRx-M, and a symbol '+' indicates the low-gain mode TRx-L, which are gain modes of amplifier considering the transmitter and the receiver. As seen from the measurement results of FIG. 3, the BPSK signal used in the experiment requires an SNR of 5 dB or more. Therefore, a signal transmission distance in the low-gain mode is less than 100 m. In the medium gain mode, however, the signal transmission distance may be extended to about 500 m. Furthermore, the signal transmission distance in the high gain mode may be extended to 750 m. This measurement results represent the relation with the SNR based on the distance in the outdoor environment. The SNR is a factor proportional to EVM. However, it is known that the number of obstacles and a distance indicator are proportional to each other in an indoor environment. That is, a system designed to transmit a signal a long distance may transmit and receive the signal through several obstacles in an indoor environment. In the embodiment of the present invention, which uses the structure and method for switching the high-gain mode and the low-gain mode by determining the magnitude of a received signal as an RSSI as shown in the measurement results of FIG. 3, a high SNR in the low-gain mode may be maintained at a distance of less than 30 m. Therefore, a high data rate mode may be supported. Furthermore, the signal transmission distance may be extended from 30 m to 750 m at a lower data rate.

Figure 4:
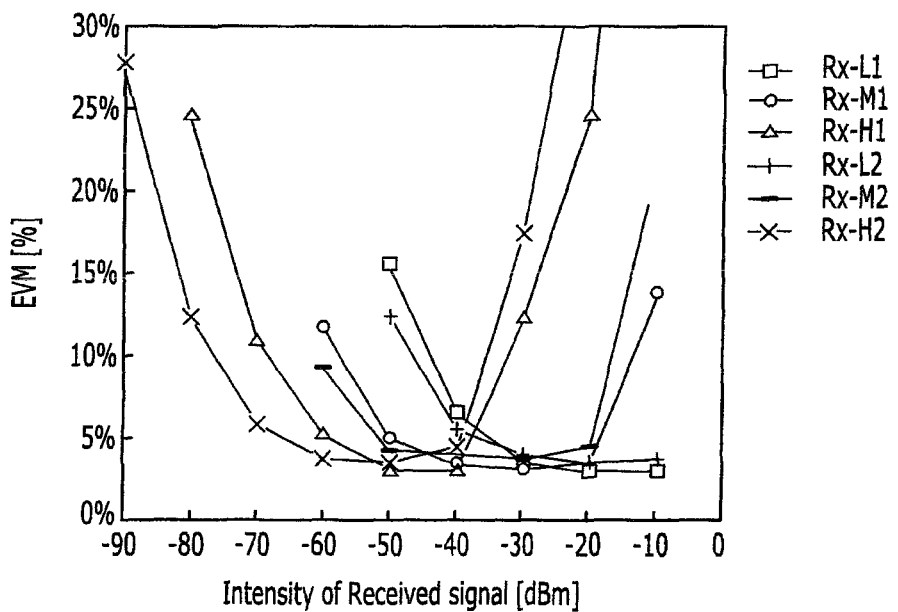
FIG. 4 is a graph showing the magnitudes of inputted signals and EVMs based on the modes of an internal low noise amplifier (LNA) and whether an external LNA operates or not.

FIG. 4 is a graph showing the magnitudes of input signals and EVMs based on the modes of the internal LNA and whether the external LNA operates or not.

In FIG. 4, 'Rx' represents a receiving end, a symbol 'L' represents the low-gain mode of the internal LNA, a symbol 'M' represents the medium-gain mode, and a symbol 'H' represents the high-gain mode. Numbers attached to the respective modes indicate whether the external LNA is used or not. That is, '1' indicates a case in which the external LNA is not used, and '2' indicates a case in which the external LNA is used. For example, L2 indicates measurement results of the magnitudes of input signals and EVMs at receiver, when the internal LNA operates in the low-gain mode and the external LNA is used. As seen from the graphs shown in FIG. 4, when the external LNA is used, an improvement effect for noise is exhibited regardless of the mode of the internal LNA. In particular, the effect becomes significant, when a small signal is inputted and the internal LNA having a poor SNR characteristic operates in the high-gain mode.

Therefore, comparing the wireless communication system to which the embodiment of the present invention is applied with a wireless communication system to which the embodiment of the present invention is not applied, it can be seen than the wireless communication system to which the embodiment is applied exhibits a more excellent effect.

In accordance with the embodiments of the present invention, the high-gain transmission power amplifier and the external LNA are not used at a short distance, but used at a long distance. Accordingly, it is possible to extend the signal transmission distance.

While the present invention has been described with respect to the specific embodiments, it will be apparent to those skilled in the art that various changes and modifications may be made without departing from the spirit and scope of the invention as defined in the following claims.

What is claimed is:

1. A transmitter for a wireless communication system, comprising:
a power amplifier configured to amplify a signal to be transmitted;
an external amplifier;
first and second transmission antennas, wherein the first transmission antenna has a first gain, and wherein the second transmission antenna has a second gain less than the first gain;
a switch configured to select one between the first and second transmission antennas;
a control unit configured to generate an antenna selection signal for controlling the switch;
a transmission selector configured to directly output the signal amplified by the power amplifier to one between the first and second transmission antennas or output the signal amplified by the power amplifier to the external amplifier to further amplify the signal, based on a mode control signal; and
a mode selector configured to compare a power level of a signal provided from a receiver with a predetermined power level to generate the mode control signal,
wherein, when the power level of the signal provided from the receiver is less than or equal to the predetermined power level, the transmitter is configured to operate in a high-gain mode where:
the mode selector generates a first mode control signal as the mode control signal,
the transmission selector outputs the signal amplified by the power amplifier to the external amplifier to further amplify the signal, in response to receiving the first mode control signal,
the control unit generates a first antenna selection signal as the antenna selection signal, and
the switch selects the first transmission antenna for transmitting the further amplified signal, in response to receiving the first antenna selection signal, and
wherein, when the power level of the signal provided from the receiver is greater than the predetermined power level, the transmitter is configured to operate in a low-gain mode where:
the mode selector generates a second mode control signal as the mode control signal,
the transmission selector bypasses the external amplifier by directly outputting the signal amplified by the power amplifier to one between the first and second transmission antennas, in response to receiving the second mode control signal,
the control unit generates a second antenna selection signal as the antenna selection signal, and
the switch selects the second transmission antenna for transmitting the bypassed signal, in response to receiving the second antenna selection signal.

2. The transmitter of claim 1, wherein the mode selector is configured to generate the mode control signal using one Received Signal Strength Indicator (RSSI) between an RSSI measured from a wireless signal and an RSSI measured from a digital-converted signal.

3. The transmitter of claim 1, wherein the second transmission antenna is a no-gain transmission antenna such that the second gain is zero.

4. A receiver for a wireless communication system, comprising:
first and second reception antennas, wherein the first reception antenna has a first gain, and wherein the second reception antenna has a second gain less than the first gain;
a switch configured to select one between the first and second reception antennas;
a control unit configured to generate an antenna selection signal for controlling the switch;
an external low noise amplifier (LNA) configured to previously low-noise amplify a second signal received from one between the first and second reception antennas;

a reception selector configured to receive the second signal and the output signal of the external LNA, and select one between the two signals to output on the basis of a mode control signal;

a mode selector configured to compare a Received Signal Strength Indicator (RSSI) of a first signal with a predetermined critical value to generate the mode control signal, wherein the receiver receives the first signal before the second signal, wherein, when the RSSI of the first signal is less than or equal to the predetermined critical value, the receiver is configured to operate in a high-gain mode where:
the mode selector generates a first mode control signal as the mode control signal,
the reception selector outputs the output signal of the external LNA, in response to receiving the first mode control signal,
the control unit generates a first antenna selection signal as the antenna selection signal, and
the switch selects the first reception antenna for receiving the second signal, in response to receiving the first antenna selection signal, and wherein, when the RSSI of the first signal is greater than the predetermined critical value, the receiver is configured to operate in a low-gain mode where:
the mode selector generates a second mode control signal as the mode control signal,
the reception selector outputs the second signal, in response to receiving the second mode control signal,
the control unit generates a second antenna selection signal as the antenna selection signal, and
the switch selects the second reception antenna for receiving the second signal, in response to receiving the second antenna selection signal.

5. The receiver of claim 4, wherein the mode selector is configured to generate the mode control signal using one RSSI between an RSSI measured from a wireless signal and an RSSI measured from a digital-converted signal.

6. The receiver of claim 4, wherein the second reception antenna is a no-gain reception antenna such that the second gain is zero.

7. A transmitter/receiver for a wireless communication system, comprising:
an external low-noise amplifier (LNA) configured to previously low-noise amplify a second signal received from an antenna;
a reception selector configured to receive the second signal and the output signal of the external LNA, and select one between the two signals to output on the basis of a first mode control signal;
a power amplifier configured to amplify a signal to be transmitted;
an external amplifier;
first and second transmission antennas, wherein the first transmission antenna has a first gain, and wherein the second transmission antenna has a second gain less than the first gain;
a switch configured to select one between the first and second transmission antennas;
a control unit configured to generate an antenna selection signal for controlling the switch;
a transmission selector configured to directly output the signal amplified by the power amplifier to one between the first and second transmission antennas or output the signal amplified by the power amplifier to the external amplifier to further amplify the signal, based on a second mode control signal; and
a mode selector configured to compare a power level of a first signal with a predetermined power level to generate the first and second mode control signals for determining outputs of the reception selector and the transmission selector, wherein the transmitter/receiver receives the first signal before the second signal, wherein, when the power level of the first signal is less than or equal to the predetermined power level, the transmitter/receiver is configured to operate in a high-gain mode where:
the mode selector generates a third mode control signal as the second mode control signal,
the transmission selector outputs the signal amplified by the power amplifier to the external amplifier to further amplify the signal, in response to receiving the third mode control signal,
the control unit generates a first antenna selection signal as the antenna selection signal, and
the switch selects the first transmission antenna for transmitting the further amplified signal, in response to receiving the first antenna selection signal, and wherein, when the power level of the first signal is greater than the predetermined power level, the transmitter is configured to operate in a low-gain mode where:
the mode selector generates a fourth mode control signal as the second mode control signal,
the transmission selector bypasses the external amplifier by directly outputting the signal amplified by the power amplifier to one between the first and second transmission antennas, in response to receiving the fourth mode control signal,
the control unit generates a second antenna selection signal as the antenna selection signal, and
the switch selects the second transmission antenna for transmitting the bypassed signal, in response to receiving the second antenna selection signal.

8. The transmitter/receiver of claim 7, wherein the mode selector is configured to generate the second mode control signal using one RSSI between an RSSI measured from a wireless signal and an RSSI measured from a digital-converted signal.

9. The transmitter/receiver of claim 7, wherein the second transmission antenna is a no-gain transmission antenna such that the second gain is zero.

* * * * *